April 1, 1952 A. HÉRAUD 2,591,355
ELECTRIC BATTERY COMPOSED OF FLAT ELEMENTS
Filed Jan. 3, 1950 6 Sheets-Sheet 1

INVENTOR:
André Héraud
By Wentworth, Lind
& Pomack
ATTORNEYS

April 1, 1952 A. HÉRAUD 2,591,355
ELECTRIC BATTERY COMPOSED OF FLAT ELEMENTS
Filed Jan. 3, 1950 6 Sheets-Sheet 2
Fig. 4.
Fig. 5.
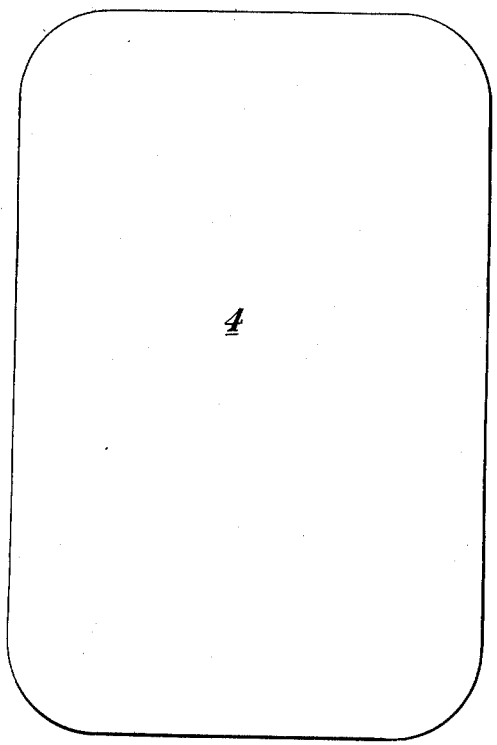
Fig. 6.
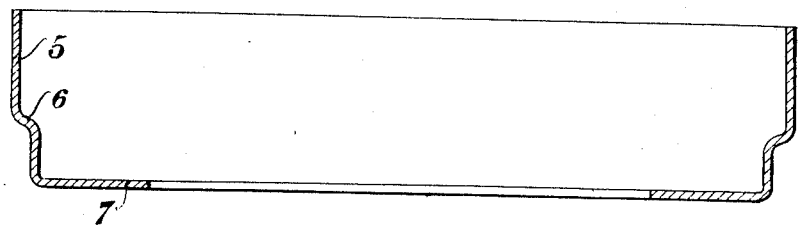
INVENTOR:
André Héraud
By Wendroth, Lind
& Ponack
ATTORNEY INVENTOR:
André Héraud
By Wendwoth, Lind
& Ponack
ATTORNEY

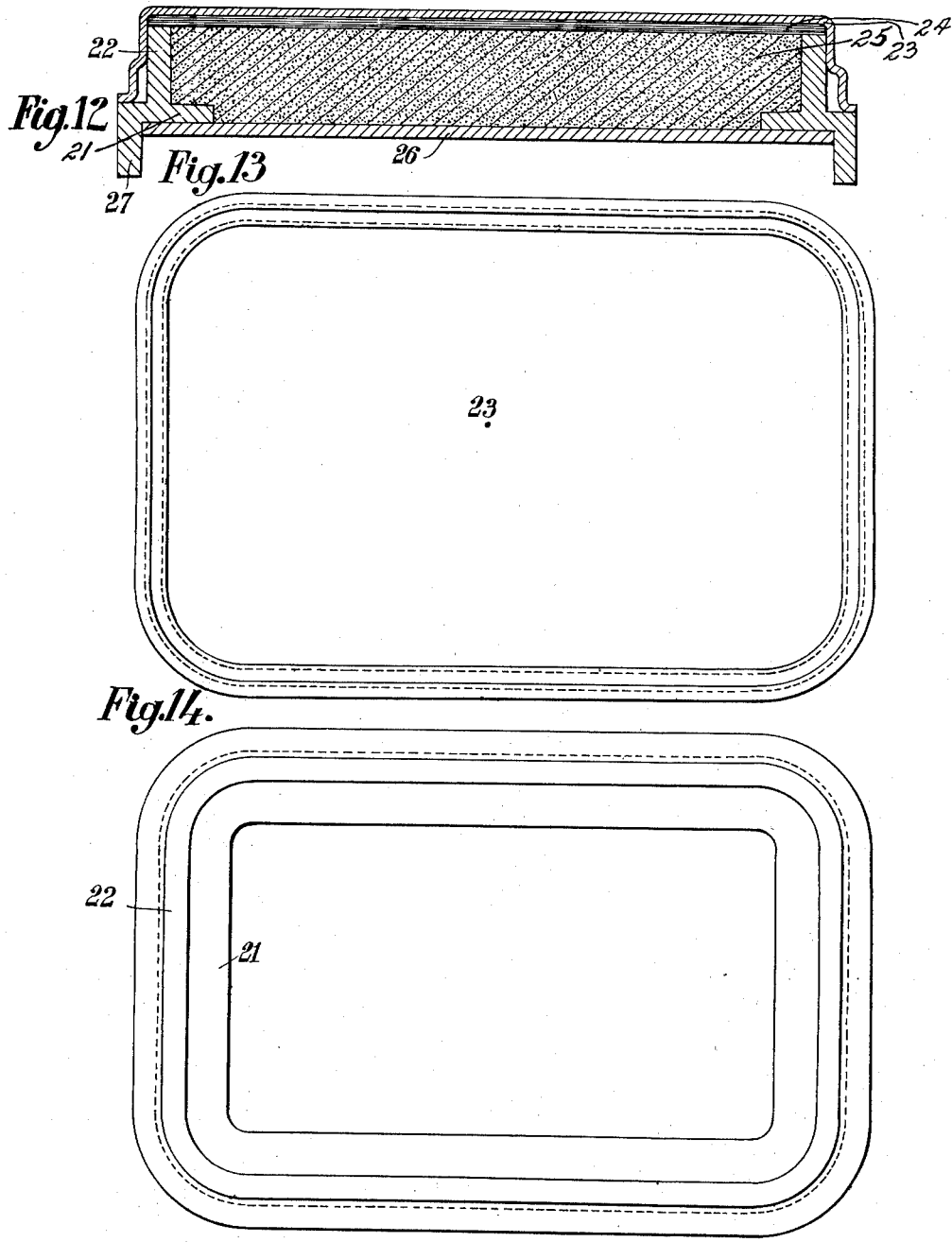

April 1, 1952 A. HÉRAUD 2,591,355
ELECTRIC BATTERY COMPOSED OF FLAT ELEMENTS
Filed Jan. 3, 1950 6 Sheets-Sheet 6

INVENTOR:
André Héraud
By Wenderoth, Lind
& Ponack
ATTORNEYS

Patented Apr. 1, 1952

2,591,355

UNITED STATES PATENT OFFICE 2,591,355

ELECTRIC BATTERY COMPOSED OF FLAT ELEMENTS

André Héraud, Saint Ouen, France, assignor to Societe Anonyme dite: Societe des Piles Wonder, Saint-Ouen (Seine), France Application January 3, 1950, Serial No. 136,485
In France January 8, 1949

5 Claims. (Cl. 136—111)

The present invention relates to an electric battery composed of flat elements.

A great many cells belonging to that kind are already known. They all comprise a bipolar electrode composed of a metal plate covered on one single side thereof with a conductive carbonaceous material which must be impervious to the electrolyte. Such a plate thus provides an anode at the one side thereof for each cell and a cathode at the opposite side for the adjacent cell. From the electrochemical point of view the two faces of the plate belong to different couples and the juxtaposition of the carbonaceous layer on the plate results in coupling two adjacent cells in series by electronic conduction.

However, such an arrangement suffers from a serious inconvenience which is detrimental to the life of batteries so constructed and which has been pointed out by the applicant in his French Patent No. 825,374, dated Nov. 20, 1936, for "Improvements in Pocket Electric Batteries," in which an adequate remedy is proposed.

The said inconvenience is located mainly at the separating slice between the metal anode and the collecting carbonaceous coat providing the cathode. Effectively, if the electrolyte in a cell finds its way from this or the other side of the bipolar plate to the said separating slice between the two electrodes which by design are in electronic connection with one another will consequently be in ionic connection and in such a state constitute a collateral (zinc-carbon) short-circuited couple, which is detrimental to the life of the main cells.

In the aforementioned patent the applicant has proposed to obviate this inconvenience by tailing in the separating slide common to the two said main electrodes yet belonging each to different cells in a plastic material cast all around the said slice, said material at the same time providing a frame adapted to receive the other constituents of the cells and contingently a plurality of frames being soldered to one another.

However, this construction of the bipolar electrode suffers from the following inconvenience: no cell can be taken separately without resort being had to the one constituent of the adjacent cell since the two constituents of said bipolar electrode belong to electrochemically different couples. It is only possible to test the battery where a plurality of cells are grouped, and in the event one of them should prove to be defective the whole cell must be scrapped.

Finally, in presently known flat piles of the kind considered the depolarizing mass is compressed in the form of a tablet either before it is introduced into the cell or within the cell itself; however, in the former case and by reason of the brittleness of the said tablet, same must be maniuplated cautiously, while in the latter case, if a hard element happens to be present in the said paste, the pressure necessary for the performance of the agglomerating process may result in the perforation of conductive carbonaceous material in contact therewith and to reach the subjacent metal, whereby a short-circuit results in the cell.

The subject-matter of the present invention resides in an arrangement of the various constituents whereby all of the aforementioned inconveniences are obviated only part of which are avoided in the embodiment described in the aforesaid French Patent No. 825,374.

This new arrangement is characterized thereby that each cell comprises the two end electrodes of an electrochemical chain, this being in contrast to batteries of the prior art which all belong to the so-called "duplex" type.

The said new arrangement will now be described in the following where reference is had to the drawing appended hereto.

Figure 4 is a section of the cathode.

Figure 5 is a plan view of the same.

Figure 6 is a section of the dish providing the envelope of the element.

Figure 12 is a section of the whole of a modification.

Figure 13 is a plan view of the anode of the same.

Figure 14 is a plan view of the dish.

According to the principle of this invention the components of the bipolar electrode (metal anode plus carbonaceous collector) are separate and belong each to a separate cell which electrochemically and physically is different from the other cell.

Figure 2:
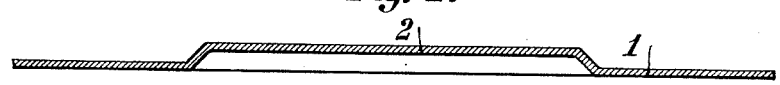
Figure 2 is a section of the zinc anode.
Figure 3:
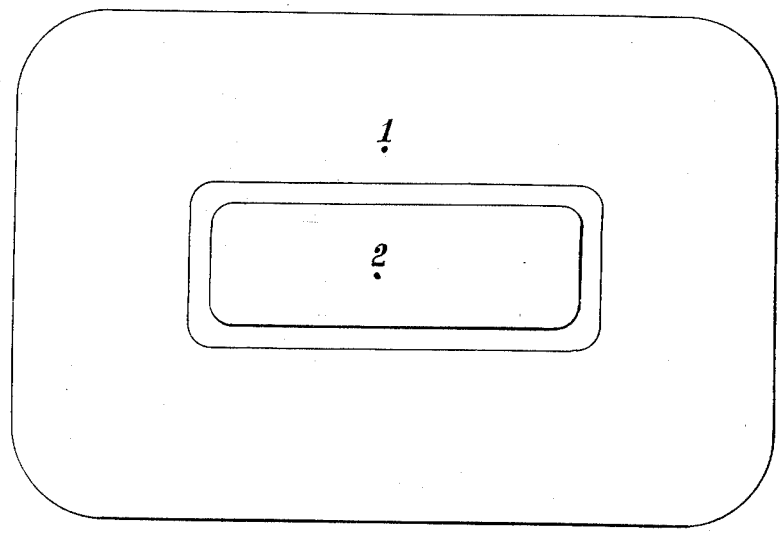
Figure 3 is a plan view of the same.

The anode illustrated in Figs. 2 and 3 is a metal plate 1, preferably a zinc plate, provided in its central portion with a shallow depression 2.

The cathode as shown in Figs. 4 and 5 is composed of a stiff core 3 provided with a great many orifices or meshes and coated by dripping with a solution containing a certain percentage of carbon. Said core provides the support of the carbonaceous material 4 and may be of any desired character provided it is of network character. For instance, it may consist of a gauze the meshes of which provide the required apertures.

The battery element also comprises an outer dish 5 made of a plastic material and providing the envelope of the element. The said dish is stamped to such a shape that any desired number of it can be fitted into one another to a pile.

The bottom of the said dish may be punched with a great many small perforations.

The sectional outline of the dish is such that its bottom portion is offset inwards with respect to its upper portion, the outer dimensions of the bottom portion being less than the outer dimensions of the top portion; 6 designates the step between the two portions.

Figure 1:
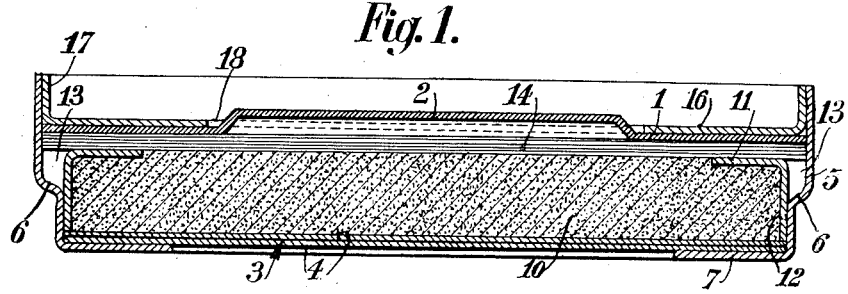
Figure 1 is a longitudinal section of a complete element.
Figure 7:
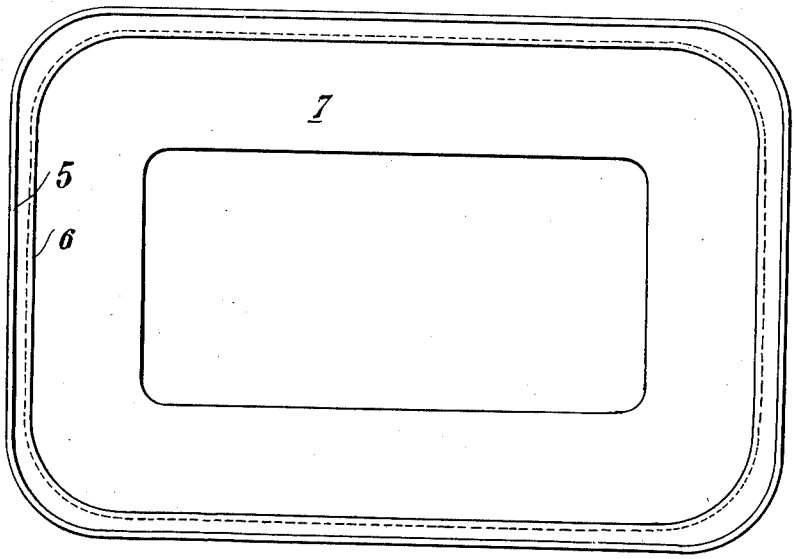
Figure 7 is a plan view of the same.

The cathode 3, 4 is cut out to the size of the inside of the retaining dish 5 in the case shown in Figs. 1, 6 and 7; it is laid on and cemented to the marginal portion 7 of the dish bottom.

Anyhow, the cathode is constructed upon the principle that it comprises a support made of a material which inherently or by acquisition is in such a chemically inert state that conduction therethrough will not be impaired materially.

This means that the cathode is no longer physically dependent on the anodic metal of the adjacent cell as it used to be heretofore.

The electric connection with the adjacent cell will henceforth be obtained by direct contact of the said cathode with the anodic metal of the adjacent cell or by electronic conduction through an intermediate conductor.

Figure 8:
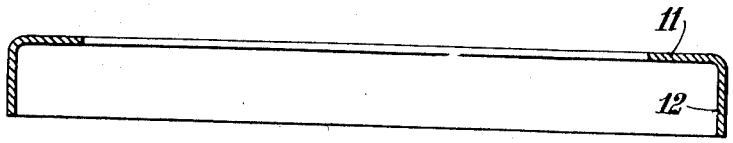
Figure 8 is a section of a frame for the depolarizing tablet.
Figure 9:
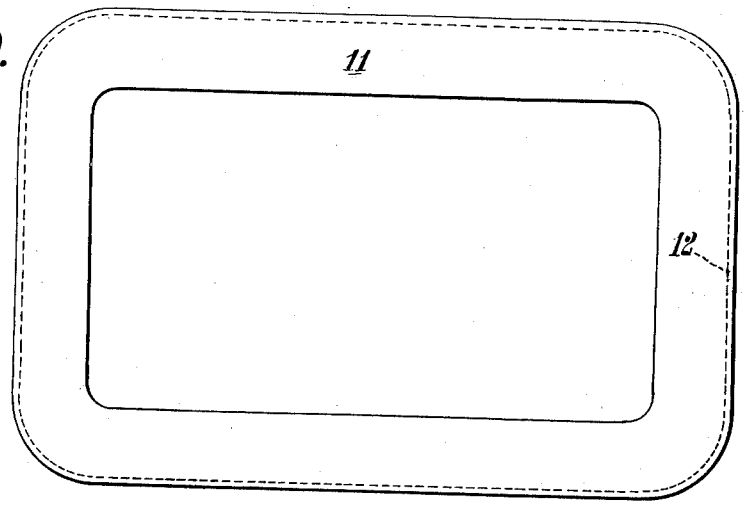
Figure 9 is a plan view of the same.

The depolarizing tablet 10 is provided outside the cell in a frame (see Figs. 8 and 9) having vertical sides 12 and the bottom 11 of which is apertured in almost the whole of its extent. The said frame is pressed from a chemically inert thermoplastic material.

The frame 11 filled with the tablet 10 of depolarizing material is laid with its larger face upon the carbonaceous material; its vertical sides 12 fit the inwardly offset sides of the retaining dish 5.

Owing to the provision of the step 6 a cavity 13 is provided thereabove for a contingent expansion of the electrolyte.

The electrolyte consists as usual of a sheet 14 of paper capable of swelling which has been immerse in a ionized solution, cut to the proper size and laid on the depolarizing tablet 10. The said electrolytic sheet occupies the whole inner section of the dish 5 and rests on the margins of the bottom of the frame 11 that contains the depolarizing tablet 10, the sides 12 of said frame providing an additional protection against an access of particles of the depolarizing material to the anode by creeping between the margins of the electrolytic paper 14 and the anode 1 resting on the latter.

The anode 1 is punched as usual from sheet metal to the size of the inside of the retaining dish 5.

Figure 10:
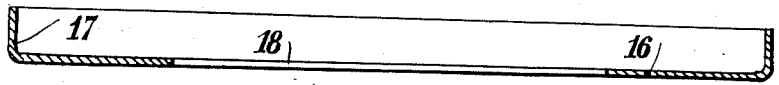
Figure 10 is a section of the cover of the element.
Figure 11:
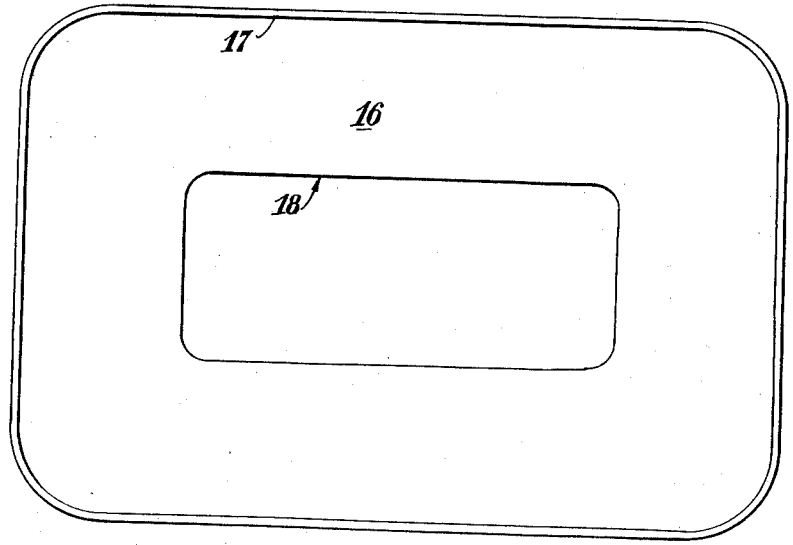
Figure 11 is a plan view of the same.

The said anode is pressed upon the aggregate thus described by means of a cup-like cover 16 pressed from plastic material as shown in Figs. 10 and 11.

Said cup-like cover has vertical sides and is formed in its bottom with an aperture the dimensions of which are slightly larger than those of the protuberance 2 on the anodic plate. Said cover is united at its sides to the dish 5 by dielectric loss or any other suitable method, and so is it to the anode 1 on which it is rested.

The anode 1 is accessible from the outside of the element, owing to what electronic connection can contingently be established with the cathode of an adjacent cell by superimposition, electric contact being ensured through the aperture 18 in the aforesaid cover 16. The latter is so dimensioned externally that the inwardly offset bottom of the next dish 5 can be forced thereinto.

The advantages of the primary feature of the invention are obvious.

Every retaining dish 5 filled with the constituents enumerated hereinbefore provides a complete battery element which is independent since it comprises as the terminals of the cell an anode and a cathode between which the depolarizer and the electrolyte are contained. Such a self-contained unit is rigid and can be stocked singly, which makes it possible e. g. to ascertain how it behaves before it is associated with one or several other cells; this is of considerable advantage since when at any time, in batteries of the kind referred to yet composed of cells which are not self-contained, any one of the cells becomes defective and consequently the defect cannot be detected unless a plurality of cells are connected in series, the whole cell group must be scrapped.

Where two or more cells are connected in series the connection between the anode of the one cell and the cathode of the next one are located at a considerable distance from the electrolyte (anolyte or catholyte) and can never lead to the accidents mentioned in the introduction to this specification.

Finally, where a plurality of cells are pressed into one another to a battery, the depolarizing tablet which is firmly maintained in its frame is not liable to break, in addition to what a chamber 13 is left into which contingently the electrolyte can expand just the same as in convenional cylindrical or prismatic cells comprising an axial carbon pencil.

In the modification illustrated in Figs. 12 to 16 the depolarizing tablet, instead of being compressed outside the cell in a separate frame, is provided inside the cell itself and the frame is done away with.

Here, instead of the anode consisting of a metal sheet cut to the size of the inside of the dish and formed with a central protuberant portion, it consists of a stamped zinc cover adapted to cap the cell.

The flanges of the said cap are coated on their inner faces with an insulating plastic material that seals the cell and protects the said cap against any undesired contact with particles of depolarizing material that might escape from the cathode.

An advantage of this arrangement of the anode is that the dish with vertical sides provided in the first embodiment of the invention is done away with and that it becomes possible to ascertain the voltage drop in each element even where it is connected with similar ones to a pile.

Effectively, the arrangement described hereinbefore in which each element is self-contained from the electrochemical point of view is retained; however, where a plurality of similar elements are packed together to a pile it becomes possible to test the elements individually since the anode of any one of them, when in contact with the carbonaceous coat of the adjacent element providing the cathode of the latter, makes it possible to reach the one pole of the latter, and the anode of the latter providing the other pole.

It will be appreciated that where a plurality of cells are connected in series it is always possible to test each cell by contacting the sides of the successive zinc anodes.

This modification is illustrated in Figs. 12 to 16 and will be described hereinafter.

Figure 15:
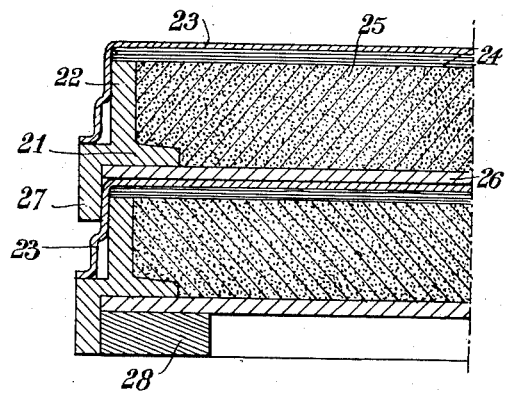
Figure 15 is a fractional section showing the two elements assembled.
Figure 16:
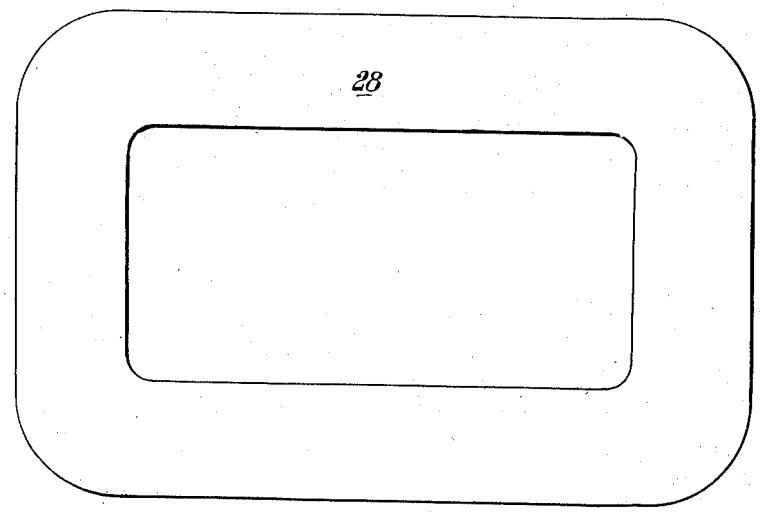
Figure 16 is a plan view of the end cardboard seal.

As shown in Figs. 12 and 15 the dish 21 is formed with a flange 22 to be capped by a zinc cover 23 (see Figs. 12 and 13) providing the anode and coated inside with a sealing plastic material. The electrolyte 24 is made of sized muslin or paper. The depolarizing material 25 is accommodated directly in the dish 21. The cathode 26 is held in position by extensions 27 of the dish 21. A safety cardboard shim 28 may be inserted to hold the cathode as shown in Fig. 16.

Fig. 15 shows a pair of superposed elements, and evidences the possibility of testing each cell by contacting the sides of the anodes 23.

The embodiment just described may be modified, notably as to the shape and proportions of the dishes, without thereby departing from the scope of the invention.

What I claim as my invention and desire to secure by Letters Patent is:

1. In a dry cell battery construction containing at least one cellular unit of a zinc anode, electrolyte, depolarizer and carbon cathode, in which each cell in a plurality of cells may be separately tested by contacting the sides of the successive zinc anodes, that arrangement comprising in order, an outer, stepped, insulating retaining frame provided with an upwardly extending flange portion, an outwardly extending flange portion stepped from the upwardly extending portion and an inwardly stepped shelf being in substantially the same plane as the outwardly extending flange portion, the periphery of said shelf defining the aperture in the base of said frame, a cup-shaped zinc anode enclosing the upwardly extending flange portion of said frame and seated on the outwardly extending flange portion of said frame, a layer of electrolyte between said zinc anode and said upwardly extending flange portion, a depolarizer in said frame and a carbon cathode layer closing said aperture in the frame.

2. A dry cell battery construction as in claim 1 wherein the insulating frame is a plastic, and a sealing coating of plastic is provided to seal the sides of the upwardly extending flange portion to the zinc anode.

3. A dry cell battery construction as in claim 1 wherein the sides of the cup-shaped zinc anode are stepped to enclose a peripheral expansion chamber about the upwardly extending flange portion of said frame member.

4. A dry cell battery construction as in claim 1 wherein the carbon cathode layer comprises a conductive coated carbonaceous layer cemented to close the aperture at the inner shelf of the frame.

5. A plurality of unit cellular dry cells as in claim 1 wherein the downwardly extending flange portion of the frame of one cell grips the anode of the successive cell.

ANDRÉ HÉRAUD.

REFERENCES CITED

The following references are of record in the file of this patent:

UNITED STATES PATENTS

| Number | Name | Date |
| --- | --- | --- |
| 1,611,153 | Benner et al. | Dec. 21, 1926 |
| 1,613,585 | Dam | Jan. 4, 1927 |
| 1,737,130 | Storey et al. | Nov. 26, 1929 |
| 2,416,576 | Franz et al. | Feb. 25, 1947 |
| 2,526,789 | Woodring | Oct. 24, 1950 |
| 2,536,698 | Ruben | Jan. 2, 1951 |

FOREIGN PATENTS

| Number | Country | Date |
| --- | --- | --- |
| 25,465 | Sweden | Nov. 23, 1906 |
| 235,835 | Switzerland | Dec. 31, 1944 |
| 363,135 | France | July 21, 1906 |
| 391,983 | Germany | Mar. 19, 1924 |
| 727,574 | Germany | Nov. 6, 1942 |